United States Patent
Schaeffler et al.

(10) Patent No.: US 12,464,491 B2
(45) Date of Patent: Nov. 4, 2025

(54) DIRECTION FINDING METHOD AND DIRECTION FINDING SYSTEM

(71) Applicant: Rohde & Schwarz GmbH & Co. KG, Munich (DE)

(72) Inventors: Florian Schaeffler, Munich (DE); Sebastian Widmann, Munich (DE); Karin Hedman, Munich (DE); Ulrike Buhl, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 441 days.

(21) Appl. No.: 17/980,922

(22) Filed: Nov. 4, 2022

(65) Prior Publication Data
US 2023/0139763 A1 May 4, 2023

(30) Foreign Application Priority Data
Nov. 4, 2021 (DE) .................. 10 2021 128 769.3

(51) Int. Cl.
*H04W 64/00* (2009.01)

(52) U.S. Cl.
CPC .................. *H04W 64/006* (2013.01)

(58) Field of Classification Search
CPC ......... H04W 56/0035; H04W 56/0015; H04W 56/005; H04W 16/28; H04W 52/16; H04W 74/002; H04W 74/004; H04W 8/24; H04W 4/026; H04W 64/006
See application file for complete search history.

(56) References Cited

U.S. PATENT DOCUMENTS

| | | | |
|---|---|---|---|
| 5,768,477 A | 6/1998 | Johnson et al. | |
| 11,630,996 B1 * | 4/2023 | O'Shea | G06N 3/0455 706/25 |
| 2013/0096861 A1 * | 4/2013 | Belloni | G01S 5/021 702/94 |
| 2023/0144796 A1 * | 5/2023 | DePoy | G06N 20/00 706/12 |

* cited by examiner

*Primary Examiner* — Kwasi Karikari
(74) *Attorney, Agent, or Firm* — CHRISTENSEN O'CONNOR JOHNSON KINDNESS PLLC (57) ABSTRACT

A direction finding method of determining bearings of radio signals by a direction finding system is described. Further, a direction finding system for determining bearings of radio signals is described.

19 Claims, 3 Drawing Sheets

DIRECTION FINDING METHOD AND DIRECTION FINDING SYSTEM

FIELD OF THE DISCLOSURE

Embodiments of the present disclosure generally relate to a direction finding method of determining bearings of radio signals by a direction finding system. Embodiments of the present disclosure further relate to a direction finding system for determining bearings of radio signals.

BACKGROUND

In conventional direction finding techniques, radio signals are received via at least two antennas and processed by a direction finding algorithm in order to determine the bearings of the radio signals.

However, conventional direction finding techniques usually require that different radio signals occupy different frequencies in order to determine the bearings of multiple radio signals, or that the number of signals occupying a single frequency is known.

However, in practice the number of emitters sending on a specific frequency and/or the number of different paths a radio signal takes from an emitter to a receiver may not be known.

Thus, there is a need for a direction finding method as well as a direction finding system that allow for determining the bearings of radio signals without a priori knowledge of the number of signals occupying a frequency.

SUMMARY

Embodiments of the present disclosure provide a direction finding method of determining bearings of radio signals by a direction finding system. In an embodiment, the direction finding system comprises at least two antennas, at least two receivers being coupled with one of the at least two antennas, respectively, at least two analog-to-digital converters (ADCs), a pre-processing circuit, and an analysis circuit. In some embodiments, the direction finding method comprises the steps of:
  receiving, by the at least two receivers, electromagnetic waves via the at least two antennas, thereby obtaining at least two input signals;
  digitizing, by the at least two ADCs, the at least two input signals, thereby obtaining at least two digitized input signals;
  generating, by the pre-processing circuit, input signal data based on the at least two digitized input signals;
  determining, by the analysis circuit, whether the received electromagnetic waves comprise at least one useful signal based on the input signal data;
  determining, by the analysis circuit, a bearing of a first useful signal based on the input signal data; and
  removing, by the analysis circuit, data corresponding to the first useful signal from the input signal data, thereby obtaining modified input signal data.

In some embodiments, any suitable technique, for example any suitable technique known in the state of the art, may be used in order to determine the bearing of the first useful signal based on the input signal data.

The direction finding methods according to the present disclosure are based on the idea to iteratively isolate different useful signals and determine the bearings of the useful signals.

This is achieved by first determining the bearing of the first useful signal identified in the received electromagnetic waves by the analysis circuit. Afterwards, the data corresponding to the first useful signal is removed from the input signal data, i.e. the modified input signal data corresponds to the received electromagnetic waves with the first useful signal removed.

For example, an interference cancellation technique may be used in order to remove the data corresponding to the first useful signal from the input signal data.

Afterwards, the modified input signal may be analyzed by the analysis circuit again, analogously to the original input signal data, in order to identify further useful signals and determine their respective bearings, as will be described in more detail below.

Therein, different useful signals may correspond to signals being emitted by different emitters, i.e. the different useful signals may have different sources. However, different useful signals may also be emitted by the same emitter and may travel via different paths, e.g. due to reflections in the atmosphere.

The direction finding methods according to the present disclosure allow for determining the bearings of a plurality of useful signals without a priori knowledge of the number of useful signals.

In some embodiments, the direction finding methods according to the present disclosure allow for determining the bearings of a plurality of useful signals occupying the same frequency or rather frequencies without a priori knowledge of the number of useful signals occupying the same frequencies.

Of course, the direction finding methods according to the present disclosure may also be used for determining the bearing of a single useful signal.

According to an aspect of the present disclosure, the direction finding method further comprises, for example, the steps of:
  determining, by the analysis circuit, whether the modified input signal data comprises at least one further useful signal;
  determining, by the analysis circuit, a bearing of a second useful signal based on the modified input signal data; and
  removing, by the analysis circuit, data corresponding to the second useful signal from the modified input signal data.

These steps may be repeated an arbitrary number of times in order to determine the bearings of an arbitrary number of useful signals. Thus, different useful signals are iteratively isolated and the respective bearings are determined.

In some embodiments, the steps described above may be repeated until the analysis circuit finds there is no more useful signal present in the electromagnetic waves or in the modified input signal data.

Alternatively or additionally, the steps described above may be repeated until the bearings of a predefined number of useful signals are determined. The predefined number may be preset and/or may be adjustable by an operator.

Accordingly, the direction finding methods according to the present disclosure may also be called an "iterative super resolution direction finding methods".

In an embodiment of the present disclosure, a binary quantity is determined by the analysis circuit, wherein the binary quantity is indicative of whether the received electromagnetic waves comprise at least one useful signal. For example, the value of the binary quantity may be equal to "1" if the received electromagnetic waves comprise at least one useful signal. The value of the binary quantity may be equal to "0" if the received electromagnetic waves do not comprise at least one useful signal. Thus, an easy to understand measure is provided for whether the received electromagnetic waves comprise at least one useful signal.

According to another aspect of the present disclosure, the analysis circuit comprises, for example, a machine-learning circuit. In some embodiments, the machine-learning circuit is pre-trained to determine whether the received electromagnetic waves comprise at least one useful signal, determine bearings of useful signals and/or remove data corresponding to useful signals from the input signal data. The use of machine-learning techniques offers a plurality of advantages.

For example, machine-learning techniques have proven to be less computationally expensive than traditional direction finding algorithms. This allows for the use of more cost-efficient hardware, e.g. more cost-efficient FPGAs, in order to implement the direction finding methods according to the present disclosure in the analysis circuit. Moreover, machine-learning techniques have proven to yield correct results even if antenna imperfections, environmental impairments or other disturbances are present. As another example, machine-learning techniques have proven to require less samples of the electromagnetic waves compared to traditional direction finding algorithms in order to obtain the same level of accuracy.

In a further embodiment of the present disclosure, the machine-learning circuit comprises a first machine-learning sub-circuit that is pre-trained to determine whether the received electromagnetic waves comprise at least one useful signal and to determine bearings of useful signals. Accordingly, the first machine-learning sub-circuit is specifically trained to determine whether the received electromagnetic waves comprise at least one useful signal, for example wherein the first machine-learning sub-circuit is configured to generate the binary quantity described above. Additionally, the first machine-learning sub-circuit is specifically trained to determine bearings of useful signals based on the input signal data.

Another aspect of the present disclosure provides that the machine-learning circuit comprises, for example, a second machine-learning sub-circuit that is pre-trained to remove data corresponding to useful signals from the input signal data. Thus, the data corresponding to useful signals is removed from the input signal data by a machine-learning technique rather than using conventional interference cancellation techniques.

In some embodiments, the machine-learning circuit comprises at least one artificial neural network. In some embodiments, the first machine-learning sub-circuit and/or the second machine-learning sub-circuit may be established as an artificial neural network, respectively.

In some embodiments, the artificial neural network may comprise at least one fully connected layer.

In an embodiment of the present disclosure, the input signal data comprises a complex-valued covariance matrix associated with the at least two digitized input signals. In general, the complex-valued covariance matrix comprises information on variances and covariances of samples associated with the digitized input signals, and thus on samples associated with the received electromagnetic waves.

The complex-valued covariance matrix may be determined based on the digitized input signals by any suitable mathematical method.

The complex-valued covariance matrix may be used as an input value of the machine-learning circuit described above, for example of the first machine-learning sub-circuit described above.

According to an aspect of the present disclosure, a real-valued vector or a complex-valued vector is determined, for example, based on the complex-valued covariance matrix. The real-valued vector or the complex-valued vector corresponds to an input quantity of the analysis module. Accordingly, based on the real-valued vector or the complex-valued vector, the analysis module may determine whether the received electromagnetic waves comprise at least one useful signal, determine bearings of useful signals, and/or remove data corresponding to useful signals from the input signal data.

Alternatively, the real-valued vector or the complex-valued vector may be determined directly based on the at least two digitized input signals and/or based on the input signal data.

Accordingly, the machine-learning circuit described above may be configured to process real-valued or complex-valued input quantities, namely the real-valued vector or the complex-valued vector.

In a further embodiment of the present disclosure, the input signal data comprises IQ data associated with the at least two digitized input signals. Thus, the input signal data comprises in-phase (I) data and quadrature (Q) data, which together establish the IQ data. Accordingly, the input signal data comprises information about amplitudes and phases of the input signals received by the at least two antennas.

Another aspect of the present disclosure provides, for example, that the input signal data comprises frequencies of the input signals and/or signal strengths of the input signals. This additional information can be used by the analysis circuit in order to distinguish between different signals.

The input signals may be integrated over a predetermined reception time, thereby obtaining accumulated signals. The further steps of the direction finding methods described above may be performed based on the accumulated signals. Accordingly, the accumulated signals may be digitized, pre-processed, etc. It has turned out that the accuracy of the determined bearing(s) can be enhanced by integrating the input signals over the predetermined reception time.

Of course, the integration could also be performed in the digital domain, i.e. the digitized input signals may be integrated over time, thereby obtaining digital accumulated signals. The further steps of the direction finding method described above may be performed based on the digital accumulated signals. Accordingly, the accumulated signals may be pre-processed, etc.

According to an aspect of the present disclosure, a quality metric associated with the first useful signal is determined. In some embodiments, the quality metric is determined by the analysis circuit, for example by the machine-learning circuit or rather the first machine-learning sub-circuit described above. In general, the quality metric is a measure of the signal quality of the first useful signal. Thus, additional information on the first useful signal is provided. Of course, the quality metric may be determined for each useful signal comprised in the electromagnetic waves.

According to another aspect of the present disclosure, a confidence metric associated with the determined bearing of the first useful signal is determined. In some embodiments, the confidence metric is determined by the analysis circuit, for example by the machine-learning circuit or rather the first machine-learning sub-circuit described above. In general, the confidence metric corresponds to an estimate of the precision of the determined bearing(s). Of course, the confidence metric may be determined for each useful signal comprised in the electromagnetic waves.

In an embodiment of the present disclosure, a predefined frequency band is selected by the at least two receivers, respectively. In some embodiments, the same predefined frequency band is selected by the at least two receivers, respectively. Thus, useful signals comprised in the predefined frequency band can be identified and their bearings be determined, as described above.

The predefined frequency may be adjustable, for example adjustable by an operator of the direction finding system. Thus, specific frequency bands of interest can be searched for useful signals.

In some embodiments, noise in the at least two digitized input signals is discarded in order to determine whether the received electromagnetic waves comprise at least one useful signal. Accordingly, the step of determining the bearing of the first useful signal may only be performed if a useful signal is detected inside the noise. If the digitized input signals comprise only noise, no useful signal is present and the step of determining the bearing may not be performed. For example, the noise comprised in the at least two digitized input signals may be estimated by any suitable technique known in the state of the art.

Embodiments of the present disclosure further provide a direction finding system for determining bearings of radio signals. In an embodiment, the direction finding system comprises at least two antennas being configured to receive electromagnetic waves. The direction finding system also comprises at least two receivers being coupled with one of the at least two antennas, respectively, wherein the at least two receivers are configured to convert the electromagnetic waves into an input signal, respectively, thereby obtaining at least two input signals. The direction finding system further comprises at least two analog-to-digital converters (ADCs), the at least two ADCs being configured to digitize the at least two input signals, thereby obtaining at least two digitized input signals. The direction finding system further comprises a pre-processing circuit being configured to pre-process the at least two digitized input signals, thereby obtaining input signal data being associated with the at least two digitized input signals. The direction finding system further comprises an analysis circuit, wherein the analysis circuit is configured to determine whether the received electromagnetic waves comprise at least one useful signal based on the input signal data. The analysis circuit is configured to determine a bearing of a first useful signal based on the input signal data. The analysis circuit is further configured to remove data corresponding to the first useful signal from the input signal data, thereby obtaining modified input signal data.

In some embodiments, the direction finding system is configured to perform any one or more of the direction finding methods described above. Regarding the advantages and further properties of the direction finding system, reference is made to the explanations given above with respect to the direction finding method, which also hold for the direction finding system and vice versa.

According to an aspect of the present disclosure, the analysis circuit, for example, is configured to determine whether the modified input signal data comprises at least one further useful signal. In some embodiments, the analysis circuit is configure to determine a bearing of a second useful signal based on the modified input signal data. Thus, the analysis circuit is configured to iteratively identify useful signals and determine their respective bearings.

According to another aspect of the present disclosure, the analysis circuit, for example, comprises a machine-learning circuit. In some embodiments, the machine-learning circuit is pre-trained to determine whether the received electromagnetic waves comprise at least one useful signal, determine bearings of useful signals and/or remove data corresponding to useful signals from the input signal data. The advantages of machine-learning techniques discussed above with respect to the direction finding method likewise apply.

In an embodiment of the present disclosure, the machine-learning circuit comprises a first machine-learning sub-circuit that is pre-trained to determine whether the received electromagnetic waves comprise at least one useful signal and to determine bearings of useful signals. Alternatively or additionally, the machine-learning circuit comprises a second machine-learning sub-circuit that is pre-trained to remove data corresponding to useful signals from the input signal data. Thus, the machine-learning circuit may comprise two machine-learning sub-circuits that are specifically trained for different purposes.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
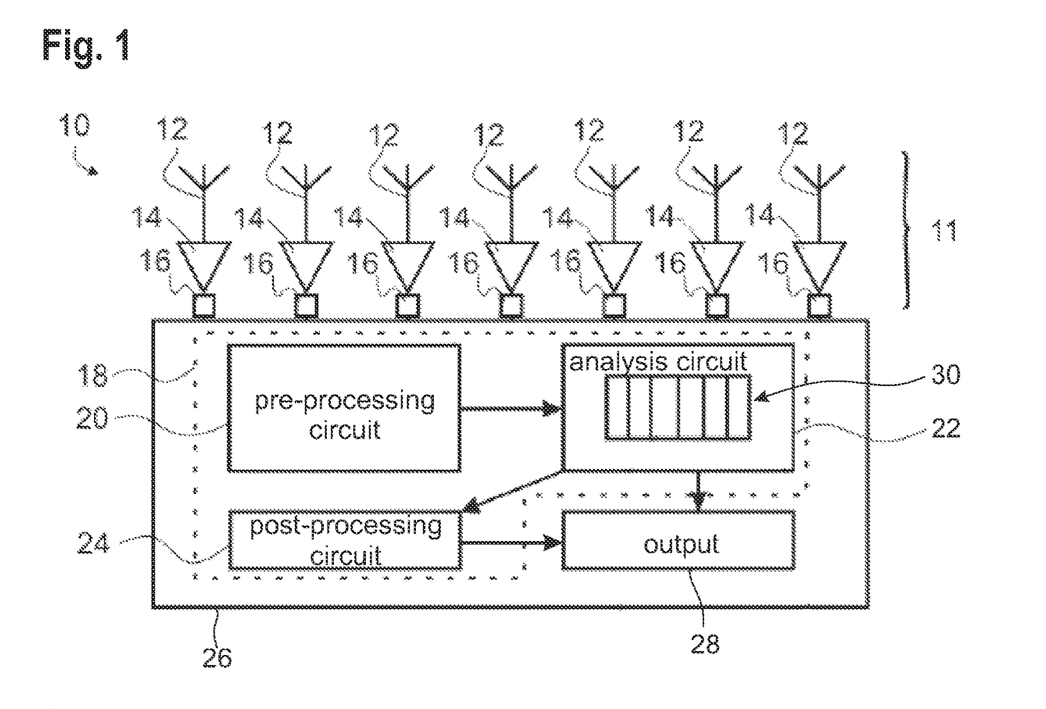
FIG. 1 schematically shows a direction finding system according to an embodiment of the present disclosure.

FIG. 1 schematically shows an embodiment of a direction finding system 10 that is configured to determine bearings of useful signals comprised in electromagnetic waves. In the embodiment shown, the direction finding system 10 comprises an antenna array 11 with several antennas 12.

In the embodiment shown in FIG. 1, the antenna array 11 comprises seven antennas 12. However, it is to be understood that the antenna array 11 may comprise any other number of antennas 12 greater than or equal to two.

Still referring to FIG. 1, the direction finding system 10 also comprises a plurality of receivers 14 being connected with one of the antennas 12, respectively. The direction finding system 10 further comprises a plurality of analog-to-digital converters (ADCs) 16 being connected with one of the receivers 14, respectively. Accordingly, one receiver 14 and one ADC 16 are allocated to each of the antennas 12. Thus, in the example embodiment shown in FIG. 1, the direction finding system 10 comprises seven receivers 14 and seven ADCs 16.

The direction finding system 10 may also comprise a control-and-analysis circuit 18 comprising a pre-processing circuit 20, an analysis circuit 22, and a post-processing circuit 24. In general, the control-and-analysis circuit 18 may be configured to control the receivers 14, the ADCs 16, the pre-processing circuit 20, the analysis circuit 22, and/or the post-processing circuit 24.

In the example embodiment shown in FIG. 1, the control-and-analysis circuit 22 is integrated in a computing device 26, which may for example be established as a dedicated measurement instrument, as a personal computer, as a laptop, or as another type of smart device.

The computing device 26 further comprises an output 28 that is connected with the post-processing circuit 24. Alternatively or additionally, the output 28 may be connected with the analysis circuit 22. It is to be understood that the computing device 26 may comprise further components that are not shown in FIG. 1, e.g. further processing circuits, a display, etc. Accordingly, it is to be understood that the output 28 may be connected to at least one further component of the computing device 26 and/or to another computing device for further processing of data provided by the analysis circuit 22.

Figure 2:
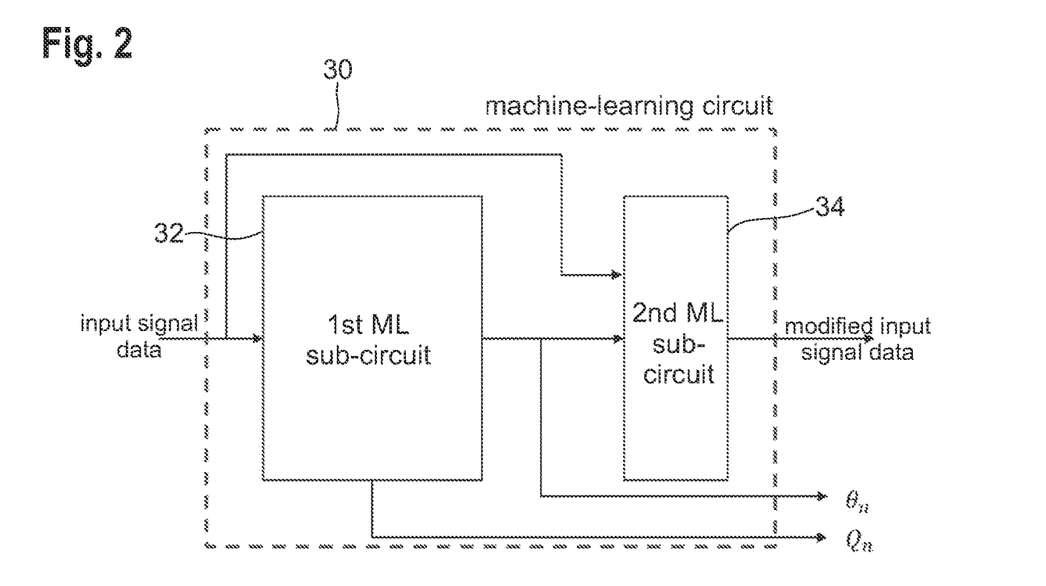
FIG. 2 schematically shows an example of a machine-learning circuit of the direction find system of FIG. 1 in more detail.

In the embodiment shown in FIG. 1, the analysis circuit 22 comprises a machine-learning circuit 30, an embodiment of which is shown in more detail in FIG. 2. The machine-learning circuit 30 comprises a first machine-learning sub-circuit 32 that is connected with the pre-processing circuit 20 so as to receive data from the pre-processing circuit 20. The machine-learning circuit 30 further comprises a second machine-learning sub-circuit 34 that is provided downstream of the of the first machine-learning sub-circuit 32.

The first machine-learning sub-circuit 32 may be established as a first artificial neural network (ANN). For example, the first artificial neural network may be a Convolutional Neural Network (CNN) having several layers. Therein, at least one of the layers of the ANN may be a fully connected layer.

The ANN may be configured to process real-valued or complex-valued input quantities, as will be described in more detail below. Accordingly, parameters of the ANN (e.g. weighting factors of the neurons) may be real-valued or complex-valued. Likewise, variables processed by the ANN may be real-valued or complex-valued. A last layer of the ANN may be configured to provide a softmax-function, i.e. a normalized exponential function.

The second machine-learning sub-circuit 34 may be established as a second ANN. For example, the second ANN may be a CNN, for example a CNN having several layers.

Figure 3:
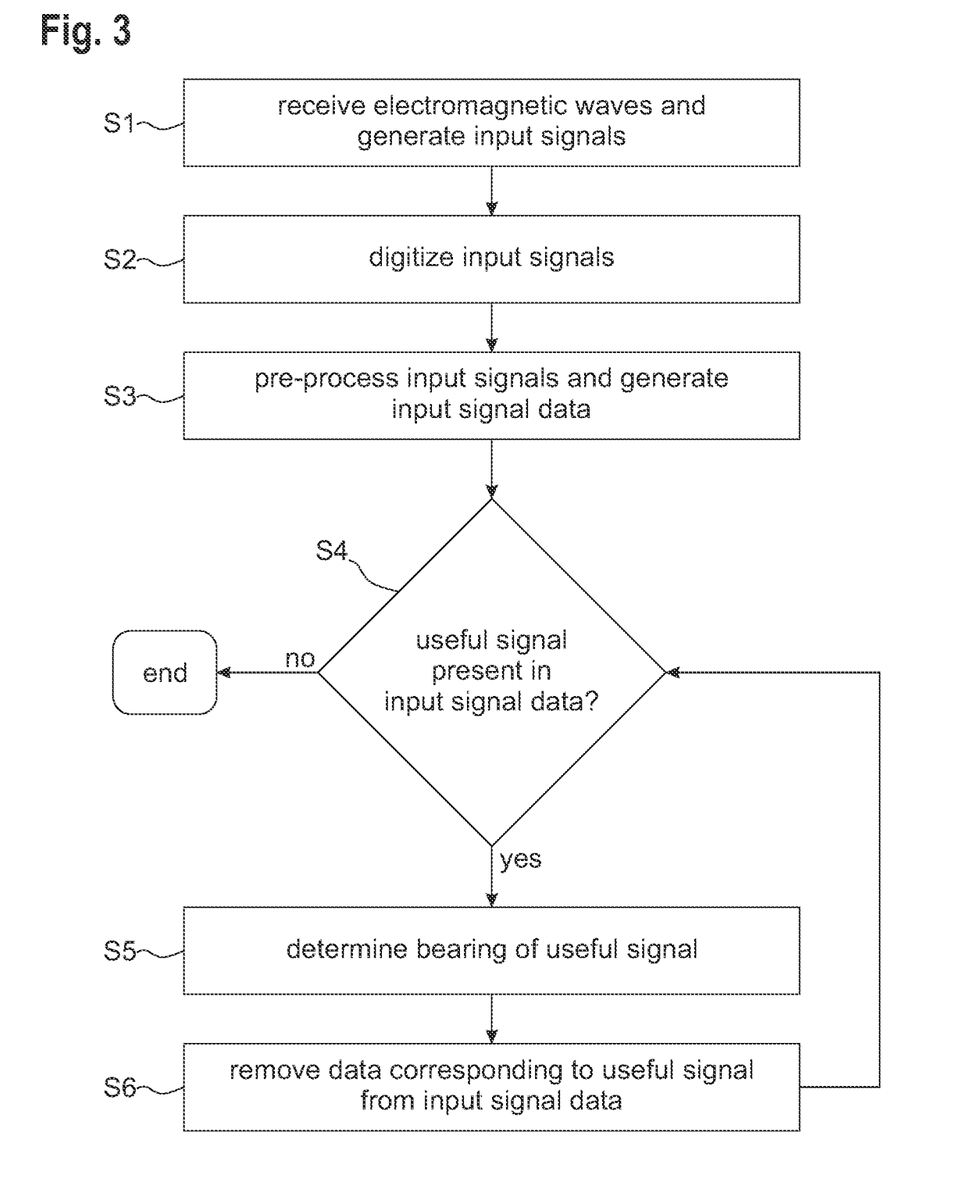
FIG. 3 shows a flow chart of a direction finding method according to an embodiment of the present disclosure.

The direction finding system 10 is configured to perform a direction finding method of determining bearings of radio signals, which is described in the following with reference to the example shown in FIG. 3.

Electromagnetic waves are received via the antennas 12 and the corresponding receivers 14, thereby obtaining a plurality of input signals being associated with the electromagnetic waves (step S1).

Therein, a predefined frequency band may be selected by the receivers 14. In other words, the input signals may correspond to the predefined frequency band of the electromagnetic waves received. The predefined frequency band may be adjustable. In some embodiments, the predefined frequency band may be adjustable via a suitable user interface of the computing device 26.

The input signals are digitized by the ADCs 16, thereby obtaining a plurality of digitized input signals (step S2).

Optionally, the input signals or the digitized input signals may be integrated over a certain reception time, and the subsequent steps of the direction finding method may be performed based on the resulting accumulated (digitized) input signals.

The digitized input signals are pre-processed by the pre-processing circuit 20, thereby obtaining input signal data (step S3).

Figure 4:
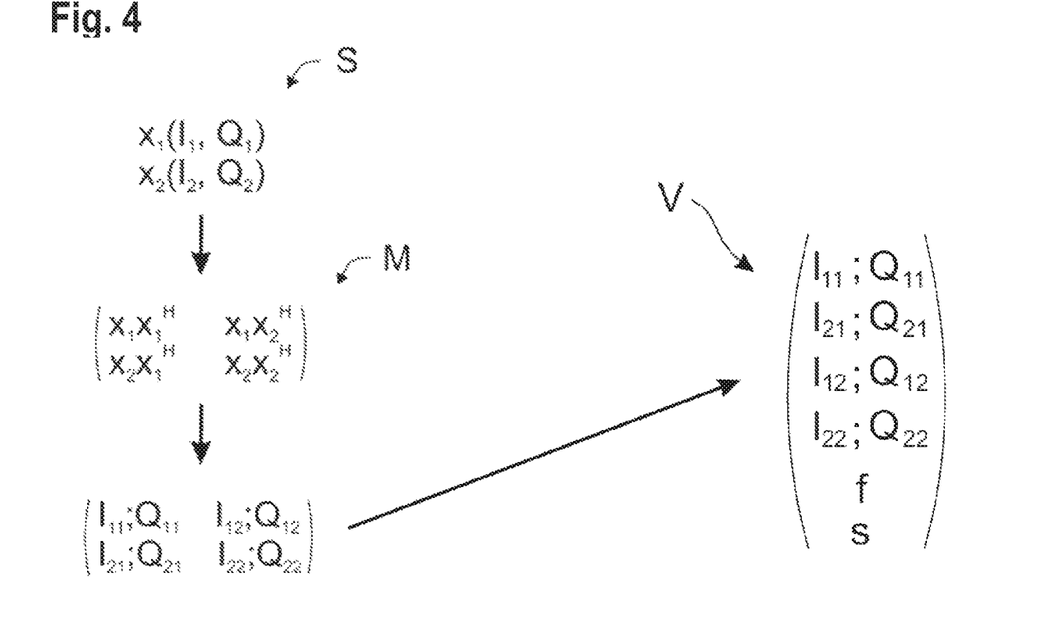
FIG. 4 shows an illustration of mathematical operations performed in the course of the direction finding method.

As is illustrated in FIG. 4, the digitized input signals correspond to a series of samples S, wherein each sample S comprises measurement values $x\_1$, $x\_2$ associated with all digital input signals. In other words, the measurement values provided by the receivers 14 at a particular point in time correspond to one sample S. The measurement values $x\_1$, $x\_2$ may correspond to IQ data, i.e. each measurement value $x\_1$, $x\_2$ may comprise in-phase data (I data) and quadrature data (Q data), as indicated by $I\_i$ and $Q\_i$ in FIG. 4.

As is further illustrated in FIG. 4, the samples S are converted into a complex-valued covariance matrix M. More precisely, for each sample S, the corresponding covariance matrix M may be determined. Therein, the superscript "H" in FIG. 4 indicates the Hermitian transpose of the corresponding measurement value. Any suitable technique may be used to determine the complex-valued covariance matrix M.

In general, the complex-values covariance matrix M is an n×n matrix, wherein n is the number of antennas 12 and thus the number of digitized inputs signals. In some embodiments, the covariance matrix M comprises measurement values associated with all digitized input signals. The individual entries of the covariance matrix M are complex-valued, and can thus be expressed as I data and Q data, as is illustrated in the third line of FIG. 4.

The complex-valued covariance matrix M is converted into a vector V, which may be real-valued or complex-valued. In the following, it is assumed without restriction of generality that the vector V is a complex-valued vector. The vector V may also be called "steering vector".

As is illustrated on the right hand side of FIG. 4, the individual entries of the complex-valued vector V may correspond to the individual entries of the complex-valued covariance matrix M. Further, the vector V may be supplemented with additional information on the input signals, e.g. with the frequency f and/or with the signal strength s. Thus, the input signal data comprises the vector V, which in turn comprises information on measurement values obtained by the receivers 14, the corresponding signal frequencies, and signal strengths. Of course, other representations of the digitized input signals are also possible.

The input signal data, i.e. the complex-valued vector V, is forwarded to the machine-learning circuit 30, for example to the first machine-learning sub-circuit 32. In other words, the complex-valued vector V is an input quantity of the first machine-learning sub-circuit 32.

The first machine-learning sub-circuit 32 determines, based on the input signal data, whether the received electromagnetic waves comprise at least one useful signal (step S4).

In some embodiments, the first machine-learning sub-circuit 32 is pre-trained for this task, wherein any suitable machine-learning technique may be used. Therein, the first machine-learning sub-circuit 32 discards all noise in order to determine whether the received electromagnetic waves comprise at least one useful signal.

As is illustrated in FIG. 2, the first machine-learning sub-circuit 32 may generate a binary quantity Q_n that is indicative of whether the received electromagnetic waves or the input signal data associated with the received electromagnetic waves comprise at least one useful signal. For example, the value of the binary quantity Q_n may be equal to "1" if the received electromagnetic waves comprise at least one useful signal. The value of the binary quantity Q_n may be equal to "0" if the received electromagnetic waves do not comprise at least one useful signal.

If the first machine-learning sub-circuit 32 identifies at least one useful signal, a bearing $\theta\_n$ is determined by the first machine-learning sub-circuit 32, wherein the determined bearing $\theta\_n$ is associated with a first useful signal (step S5).

In general, the bearing $\theta\_n$ comprises an azimuth $\varphi\_n$ and an elevation $\vartheta\_n$, i.e. $\theta\_n=(\varphi\_n,\vartheta\_n)$.

Optionally, the first machine-learning sub-circuit 32 may determine a quality metric associated with the first useful signal, wherein the quality metric corresponds to a measure of the signal quality of the first useful signal. Alternatively or additionally, first machine-learning sub-circuit 32 may determine a confidence metric associated with determined bearing $\theta\_n$ of the first useful signal. The confidence metric corresponds to an estimate of the precision of the determined bearing $\theta\_n$.

The input signal data and the determined bearing $\theta\_n$ are forwarded to the second machine-learning sub-circuit 34.

Data corresponding to the first useful signal is removed from the input signal data by the second machine-learning sub-circuit 34, thereby obtaining modified input signal data (step S6).

Thus, the modified input signal data corresponds to the received electromagnetic waves with the first useful signal removed. In some embodiments, the first useful signal may be removed from the input signal data based on the determined bearing $\theta\_n$ of the first useful signal.

Steps S4 to S6 may be repeated for the modified input signal data.

Thus, the first machine-learning sub-circuit 32 determines whether the modified input signal data comprises at least one further useful signal. If this is the case, the first machine-learning sub-circuit 32 determines the bearing of a second useful signal. Afterwards, the second machine-learning sub-circuit 34 removes data corresponding to the second useful signal from the modified input signal data.

In some embodiments, steps S4 to S6 may be repeated until the first machine-learning sub-circuit 32 finds that the modified input signal data comprises no more useful signals. Alternatively or additionally, steps S4 to S6 described above may be repeated until the bearings of a predefined number of useful signals are determined. The predefined number may be preset and/or may be adjustable by an operator, e.g. via a suitable user interface of the computing device 26.

The determined bearings $\theta\_n$ as well as the associated quality metrics and confidence metrics may be forwarded to the output 28. For example, the determined bearings $\theta\_n$ as well as the associated quality metrics and confidence metrics may be forwarded to a display via the output 28 and may be displayed to a user.

Further, the determined bearings $\theta\_n$ as well as the associated quality metrics and confidence metrics may be forwarded to the post-processing circuit 24. In general, the post-processing circuit 24 may perform any operations on the data provided by the machine-learning circuit 30 that are required by the use case of the direction finding system 10.

For example, the post-processing circuit 24 may generate visualization data associated with the determined bearings $\theta\_n$, the determined quality metrics, the determined confidence metrics, the determined number of useful signals, etc. The visualization data may be visualized on a display of the computing device 26. Alternatively or additionally, the post-processing circuit 24 may determine so-called pulse descriptor words associated with the useful signals.

In the direction finding methods described above, the steps of determining whether the received electromagnetic waves comprise at least one useful signal, determining bearings of useful signals, and removing data corresponding to useful signals from the input signal data are performed by suitably pre-trained machine-learning sub-circuits 32, 34. However, it is to be understood that one or more of these steps may be performed by any suitable algorithm known in the state of the art instead.

Certain embodiments disclosed herein include components, such as receivers 14, (ADCs) 16, the control-and-analysis circuit 18, the pre-processing circuit 20, the analysis circuit 22, the post-processing circuit 24, and the a machine-learning circuit 30, etc., that utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some embodiments, the functionality described herein can be implemented by special purpose hardware-based computer systems or circuits, etc., or combinations of special purpose hardware and computer instructions. In some embodiments, the program instructions, when executed by one or more circuits, is configured to carry out any one or more of the steps of the methods described herein or claimed below. In that regard, the one or more circuits and/or memory storing the program instructions forms a special purpose circuit or circuits specifically configured to carry out the methodologies and technologies described herein.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A direction finding method of determining bearings of radio signals by a direction finding system, the direction finding system comprising at least two antennas, at least two receivers being coupled with one of the at least two antennas, respectively, at least two analog-to-digital converters (ADCs), a pre-processing circuit, and an analysis circuit, the direction finding method comprising the steps of:
   receiving, by the at least two receivers, electromagnetic waves via the at least two antennas, thereby obtaining at least two input signals;
   digitizing, by the at least two ADCs, the at least two input signals, thereby obtaining at least two digitized input signals;
   generating, by the pre-processing circuit, input signal data based on the at least two digitized input signals;
   determining, by the analysis circuit, whether the received electromagnetic waves comprise at least one useful signal based on the input signal data;
   determining, by the analysis circuit, a bearing of a first useful signal based on the input signal data;
   removing, by the analysis circuit, data corresponding to the first useful signal from the input signal data, thereby obtaining modified input signal data, wherein the modified input signal data corresponds to the received electromagnetic waves with the first useful signal removed;
   determining, by the analysis circuit, whether the modified input signal data comprises at least one further useful signal;
   determining, by the analysis circuit, a bearing of a second useful signal based on the modified input signal data; and
   removing, by the analysis circuit, data corresponding to the second useful signal from the modified input signal data.

2. The direction finding method of claim 1, wherein a binary quantity is determined by the analysis circuit, wherein the binary quantity is indicative of whether the received electromagnetic waves comprise at least one useful signal.

3. The direction finding method of claim 1, wherein the analysis circuit comprises a machine-learning circuit, wherein the machine-learning circuit is pre-trained to determine whether the received electromagnetic waves comprise at least one useful signal, determine bearings of useful signals and/or remove data corresponding to useful signals from the input signal data.

4. The direction finding method of claim 3, wherein the machine-learning circuit comprises a first machine-learning sub-circuit that is pre-trained to determine whether the received electromagnetic waves comprise at least one useful signal and to determine bearings of useful signals.

5. The direction finding method of claim 3, wherein the machine-learning circuit comprises a second machine-learning sub-circuit that is pre-trained to remove data corresponding to useful signals from the input signal data.

6. The direction finding method of claim 3, wherein the machine-learning circuit comprises at least one artificial neural network.

7. The direction finding method of claim 1, wherein the input signal data comprises a complex-valued covariance matrix associated with the at least two digitized input signals.

8. The direction finding method of claim 7, wherein a real-valued vector or a complex-valued vector is determined based on the complex-valued covariance matrix.

9. The direction finding method of claim 1, wherein the input signal data comprises IQ data associated with the at least two digitized input signals.

10. The direction finding method of claim 1, wherein the input signal data comprises frequencies of the input signals and/or signal strengths of the input signals.

11. The direction finding method of claim 1, wherein the input signals are integrated over a predetermined reception time, thereby obtaining accumulated signals.

12. The direction finding method of claim 1, wherein a quality metric associated with the first useful signal is determined.

13. The direction finding method of claim 1, wherein a confidence metric associated with the determined bearing of the first useful signal is determined.

14. The direction finding method of claim 1, wherein a predefined frequency band is selected by the at least two receivers, respectively.

15. The direction finding method of claim 1, wherein noise in the at least two digitized input signals is discarded in order to determine whether the received electromagnetic waves comprise at least one useful signal.

16. A direction finding system for determining bearings of radio signals, wherein the direction finding system comprises
   at least two antennas being configured to receive electromagnetic waves;
   at least two receivers being coupled with one of the at least two antennas, respectively, wherein the at least two receivers are configured to convert the electromagnetic waves into an input signal, respectively, thereby obtaining at least two input signals;
   at least two analog-to-digital converters (ADCs), the at least two ADCs being configured to digitize the at least two input signals, thereby obtaining at least two digitized input signals;
   a pre-processing circuit being configured to pre-process the at least two digitized input signals, thereby obtaining input signal data being associated with the at least two digitized input signals; and
   an analysis circuit, wherein the analysis circuit is configured to determine whether the received electromagnetic waves comprise at least one useful signal based on the input signal data, wherein the analysis circuit is configured to determine a bearing of a first useful signal based on the input signal data, and wherein the analysis circuit is configured to remove data corresponding to the first useful signal from the input signal data, thereby obtaining modified input signal data, wherein the modified input signal data corresponds to the received electromagnetic waves with the first useful signal removed, wherein the analysis circuit is configured to determine whether the modified input signal data comprises at least one further useful signal, and wherein the analysis circuit is configure to determine a bearing of a second useful signal based on the modified input signal data.

17. The direction finding system of claim 16, wherein the analysis circuit comprises a machine-learning circuit, wherein the machine-learning circuit is pre-trained to determine whether the received electromagnetic waves comprise at least one useful signal, determine bearings of useful signals and/or remove data corresponding to useful signals from the input signal data.

18. The direction finding system of claim 17, wherein the machine-learning circuit comprises a first machine-learning sub-circuit that is pre-trained to determine whether the received electromagnetic waves comprise at least one useful signal and to determine bearings of useful signals, and/or wherein the machine-learning circuit comprises a second machine-learning sub-circuit that is pre-trained to remove data corresponding to useful signals from the input signal data.

19. A direction finding system for determining bearings of radio signals, wherein the direction finding system comprises
   at least two antennas being configured to receive electromagnetic waves;
   at least two receivers being coupled with one of the at least two antennas, respectively, wherein the at least two receivers are configured to convert the electromagnetic waves into an input signal, respectively, thereby obtaining at least two input signals;
   at least two analog-to-digital converters (ADCs), the at least two ADCs being configured to digitize the at least two input signals, thereby obtaining at least two digitized input signals;
   a pre-processing circuit being configured to pre-process the at least two digitized input signals, thereby obtaining input signal data being associated with the at least two digitized input signals; and
   an analysis circuit, wherein the analysis circuit is configured to determine whether the received electromagnetic waves comprise at least one useful signal based on the input signal data, wherein the analysis circuit is configured to determine a bearing of a first useful signal based on the input signal data, and wherein the analysis circuit is configured to remove data corresponding to the first useful signal from the input signal data, thereby obtaining modified input signal data,
   wherein the analysis circuit comprises a machine-learning circuit,
   wherein the machine-learning circuit comprises a first machine-learning sub-circuit that is pre-trained to determine whether the received electromagnetic waves comprise at least one useful signal and to determine bearings of useful signals, and
   wherein the machine-learning circuit comprises a second machine-learning sub-circuit that is pre-trained to remove data corresponding to useful signals from the input signal data.

* * * * *